United States Patent [19]

Finkenzeller et al.

[11] 3,969,625

[45] July 13, 1976

[54] X-RAY SPOT FILM DEVICE WITH MEANS FOR ORGANWISE-PROGRAMMED SETTING OF X-RAY EXPOSURE DATA

[75] Inventors: Johann Finkenzeller; Peter Grassmann, both of Erlangen; Peter Skarke, Uttenreuth, all of Germany

[73] Assignee: Siemens Aktiengesellschaft, Erlangen, Germany

[22] Filed: Feb. 20, 1974

[21] Appl. No.: 444,245

[30] Foreign Application Priority Data

Apr. 13, 1973 Germany............................ 2318781

[52] U.S. Cl.................................. 250/322; 250/402

[51] Int. Cl.²........................................ G03B 41/16

[58] Field of Search........... 250/402, 416, 322, 343; 200/11 K, 16 C

[56] References Cited

UNITED STATES PATENTS

| | | | |
|---|---|---|---|
| 2,303,693 | 12/1942 | Hill | 200/16 C |
| 3,150,240 | 9/1964 | Voss | 200/16 C |
| 3,437,766 | 4/1969 | Ahrens | 200/11 K |
| 3,585,391 | 6/1971 | Siedband et al. | 250/416 |
| 3,860,818 | 1/1975 | Stalder et al. | 250/343 |

*Primary Examiner*—Davis L. Willis

*Attorney, Agent, or Firm*—Haseltine, Lake & Waters

[57] ABSTRACT

An X-ray targeting mechanism or X-ray spot film device including switching means for the organwise-programmed setting of exposure data on a command component. The switching means is constructed of a multi-position or rotary step switch. A plurality of legend-bearing or color-coded viewing frames are associated with the switch, and indicate the particular combinations of exposure data or organs related to each individual switch step position.

6 Claims, 3 Drawing Figures

X-RAY SPOT FILM DEVICE WITH MEANS FOR ORGANWISE-PROGRAMMED SETTING OF X-RAY EXPOSURE DATA

FIELD OF THE INVENTION

The present invention relates to an X-ray targeting mechanism or spot film device including switching means for the organwise-programmed setting of exposure data on a command component.

DISCUSSION OF THE PRIOR ART

An X-ray targeting mechanism or spot film device of this type has become known through prospectus SR 850 of Hofmann GmbH, Erlangen, West Germany. A command component is provided in this known X-ray targeting mechanism wherein, in addition to keys for effecting the organwise-programmed setting of exposure data, there is also provided a rotary switch for the free or unrestricted setting thereof.

An X-ray targeting mechanism or spot film device should be constructed so as to be as compact and space-saving as possible, in order to avoid disturbing the examining personnel during the carrying out of an examination. The use of operating or pressure keys for effecting the organwise-programmed setting of exposure data does, however, require a relatively large amount of space, which has an adverse or disturbing result.

The use of operating keys for carrying out the organwise-programmed setting of exposure data in the known X-ray targeting mechanism can be ascertained from the fact, in that operating panels including operating keys and having automatic organ programming devices have been known for quite a long time from, for example, the prospectus "AUTOMATOS" of the company "Elektrizitatsgesellschaft Sanitas", Berlin, Druckzeichen 1798.I.41.C.-Is, and from German Laid-Open Patent Specification Nos. 2,057,997, as well as 2,104,941. In the known targeting mechanism including switching means for the organwise-programmed setting of exposure data, the concept of employing operating keys for effecting the exposure data setting has been taken over from the state of the technology.

SUMMARY OF THE INVENTION

Accordingly, it is an object of the present invention to provide an X-ray targeting mechanism or spot film device pursuant to the above-mentioned type which, with regard to its construction, is considerably more compact and space-saving in comparison with presently known X-ray targeting mechanisms.

The foregoing object is inventively attained in that switching means is provided which is constructed of a multi-position or rotary step switch. Thus, the invention extends in a direction which is not at all suggested nor contemplated through the state of the technology, inasmuch as multi-position or rotary step switches also have not heretofore been employed with regard to operating panels for the organwise-programmed setting of exposure data, which are independent of an X-ray targeting mechanism.

BRIEF DESCRIPTION OF THE DRAWINGS

Further details of the invention may now be ascertained from the following description of an exemplary embodiment of the invention, taken in conjunction with the accompanying drawings; in which.

DETAILED DESCRIPTION

Figure 1:
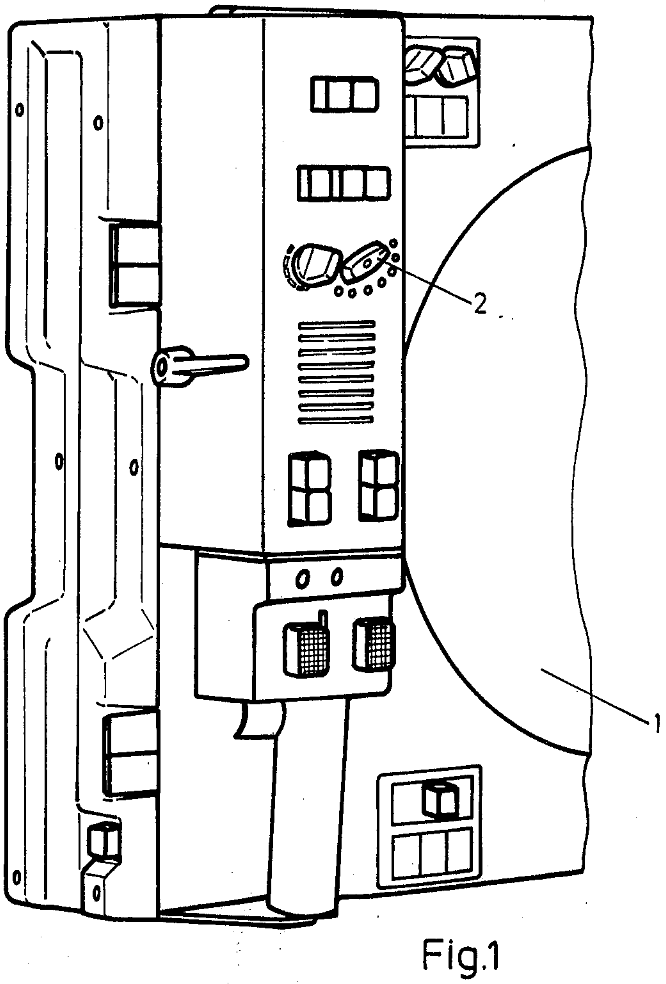
FIG. 1 is a perspective view of a command element for an X-ray targeting or spot film device according to the present invention.
Figure 2:
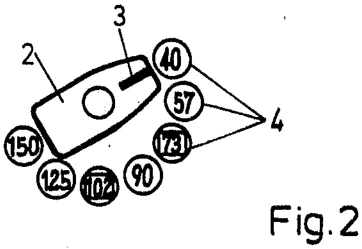
FIG. 2 illustrates, in an enlarged scale, a rotary step switch for the setting of the programmed exposure data.

Referring now in detail to the drawing, an X-ray targeting mechanism or spot film device, as shown in FIG. 1, has attached thereto an X-ray image amplifier 1 which facilitates the assumption the remote video transmission of X-ray pictures. A command component includes, in a known manner, a plurality of switching elements for control of the X-ray generator, the X-ray apparatus, and the targeting mechanism. In connection with the present invention, it is essential that a rotary step switch be present which is activated by means of a handgrip 2. This rotary step switch serves for the organwise-programmed setting of the exposure data. A mark 3 formed on the handgrip 2 has a plurality of viewing frames 4 associated therewith, and which indicate the particular exposure data or organs related to each individual step position. The indication may be carried out by providing suitable legends within the frames 4, through color markings, or through symbols such as, for example, rectangles and the like. Within the framework of the invention it is also possible, for example, to form the frames 4 in varied colors, in which a particular color signifies the type of film intensifying screen which is to be used in the X-ray film cassette. Furthermore, the associated X-ray tube voltage may be recorded in the frames 4. Finally, it is also possible to indicate the associated focus in a manner in which a rectangular shaped imprint signifies a small focus, and the absence of an imprint signifies a large focus. This is clearly illustrated in FIG. 2 of the drawings.

It is essential for the invention that, for the organwise-programmed setting of the exposure data, not only the X-ray tube voltage, but other parameters, insofar as they are to be set, there not be employed operating keys, but rather a rotary step switch. A review of the drawing clearly illustrates that the rotary step switch may be utilized on a known X-ray targeting mechanism, without requiring any modification or enlargement of the command component.

Figure 3:
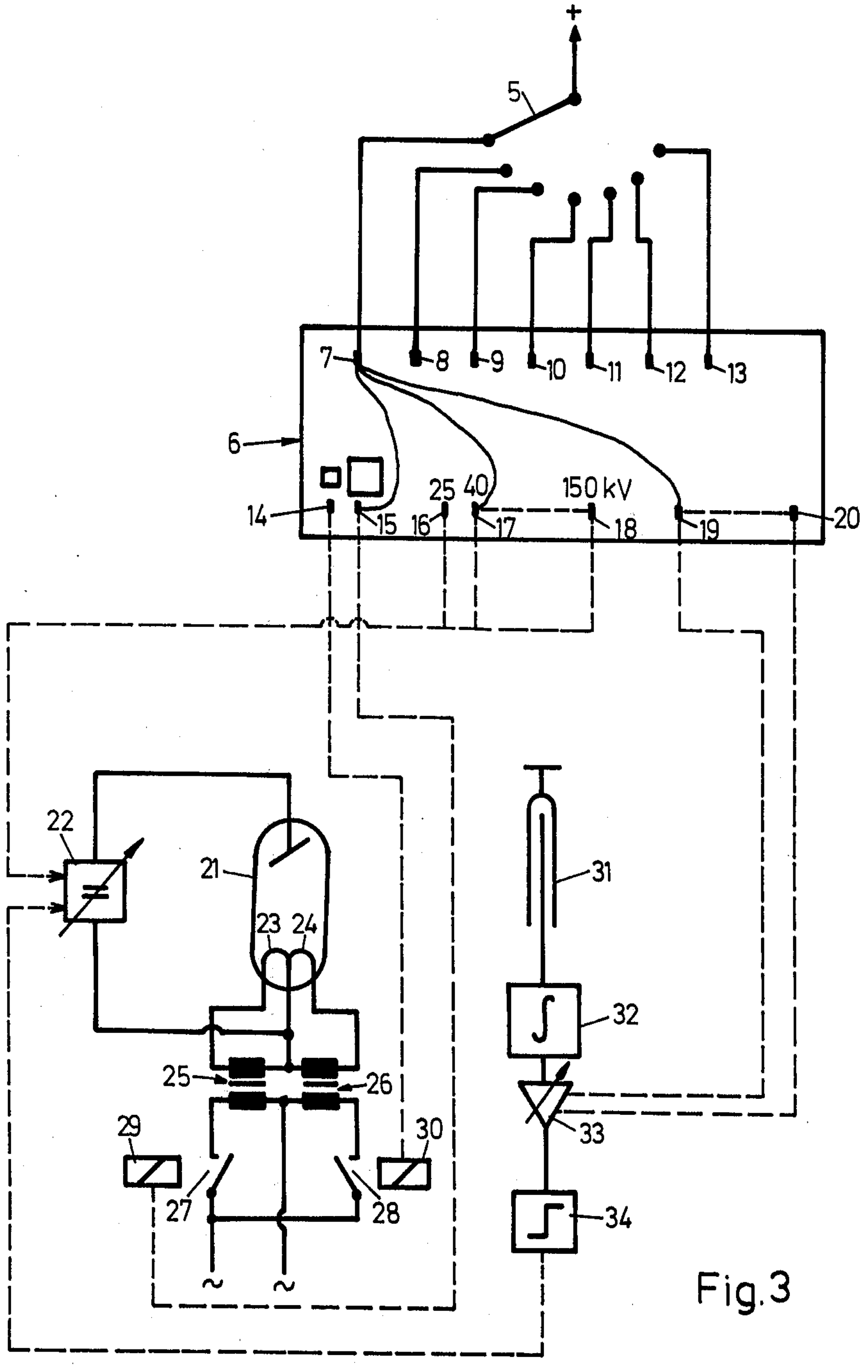
FIG. 3 shows a schematic circuit diagram for eludicating the present invention.

In FIG. 3 of the drawings, there is shown a rotary step switch 5 which is activated by means of the handgrip 2. In conformance with seven illustrated indicator frames 4, the rotary step switch has seven positions, each of which is associated with a predetermined combination of exposure data.

Conduits lead from the stationary contacts of the rotary switches 5 to a distributor 6, and namely, to the fixed points 7 through 13. Fixed points 7 through 13 have fixed points 14 through 20 associated therewith so as to facilitate the setting of the exposure data. Thus, the fixed point 14 provides for the selection of the small focus of the X-ray tube, fixed point 15 provides for the selection of the large focus, fixed points 16 through 18 provide for the selection of the X-ray tube voltage, and fixed points 19 and 20 provide for the selection of the film sensitivity. Intermediate the fixed points 17 and 18, as well as 19 and 20, there may be located further fixed points (not shown), which are representative of intermediate values.

An X-ray tube 21 is supplied with a high-tension from a direct-current voltage generator 22, in which the high-tension is adjustable in a known manner. The X-ray tube 21 includes two focuses and, consequently, two heating filaments 23 and 24 which are supplied by means of two heating transformers 25 and 26. The heating transformer 25 is actuatable from a power supply through a relay contact 27, and the heating transformer 26 through a relay contact 28. The contact 27 is energized through a relay winding 29, and the contact 28 through a relay winding 30.

The X-ray beam is ascertained through the intermediary of an X-ray measurement chamber 31. The measurement chamber 31 delivers a current to an integrator 32, which is proportionate to the dosage quantity of the X-ray beam, and which is integrated in the integrator 31. The output voltage of the integrator 32 is transmitted to an oscillator element 34 through an amplifier 33 having adjustable amplification, and which, in a known manner, effects the switching-off of the direct-current voltage source 22, and consequently that of the X-ray tube 21, upon the attainment of a predetermined ray dosage. The constructional element 31 through 34 represent the components of an automatic illuminating device. The automatic illuminating device is adapted to be correlated with the film sensitivity, in that the amplification of the amplifier 33 is varied. For this purpose, there are provided the fixed points 19 and 20 in the distributor 6, which are associated with predetermined levels of amplification of the amplifier 33.

Each of the fixed points 7 through 13 is connected with respectively one of the points 14, 15, one of the points 16 through 18, and one of the points 19 and 20. In this manner, for each position of the rotary step switch 5, there is automatically selected the focus, the X-ray tube voltage and the film sensitivity. Thus, for example, in the illustrated position of the rotary step switch 5, the large focus has been selected, since the relay 29 is excited and the contact 27 closed, and consequently a voltage is impressed on the heating filament 23. Furthermore, in the illustrated position of the rotary step switch 5, there is set an X-ray tube voltage of 40 kV, and the sensitivity of the amplifier 33 determined by the fixed point 19 has been automatically set.

While there has been shown what is considered to be the preferred embodiment of the invention, it will be obvious that modifications may be made which come within the scope of the disclosure of the specification.

What is claimed is:

1. In an X-ray spot film device, a command component, and switching means on said command component for effecting the concurrent organwise-programmed setting of a plurality of X-ray exposure data, the improvement comprising; said switching means comprising a multiple-position rotary step switch, each position of said rotary step switch being associated with a predetermined body organ of a patient whereby rotation of said switch to a respective position automatically concurrently selects a plurality of exposure data for X-raying said body organ.

2. An X-ray spot film device as claimed in claim 1, comprising a plurality of indicator frames on said command component, each said indicator frame being correlated with respectively one of the operative positions of said rotary step switch.

3. An X-ray spot film device as claimed in claim 2, said indicator frames being color-coded in conformance with an intensifying screen adapted to be used in an X-ray film cassette.

4. An X-ray spot film device claimed in claim 3, said indicator frames each being circular, rectangular imprints being formed in at least some of said indicator frames representative of a predetermined focus of an X-ray tube.

5. An X-ray spot film device as claimed in claim 4, said indicator frames having legends therein indicative of programmed X-ray tube voltages in correlation with predetermined operative positions of said rotary step switch.

6. An X-ray spot film device as claimed in claim 1, said rotary step switch concurrently selecting, for each operative position thereof, the focus of an X-ray tube, the X-ray tube voltage and the film sensitivity of an automatic exposure timer.

* * * * *